Jan. 6, 1970   J. G. SATTERTHWAITE ET AL   3,487,805
PERIPHERAL JOURNAL PROPELLER DRIVE
Filed Dec. 22, 1966   4 Sheets-Sheet 2
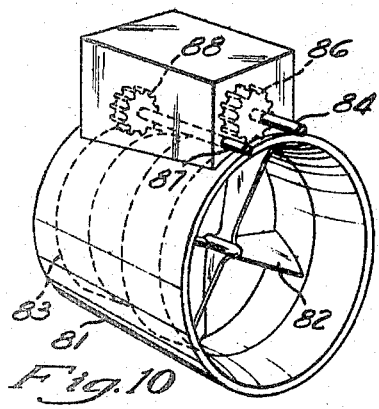
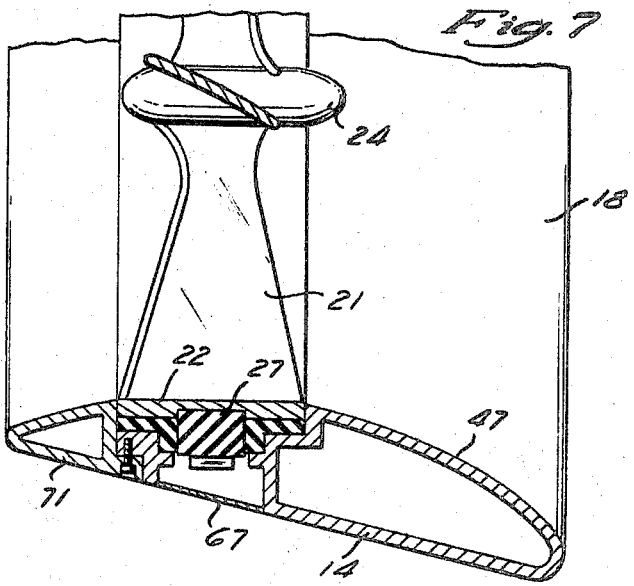
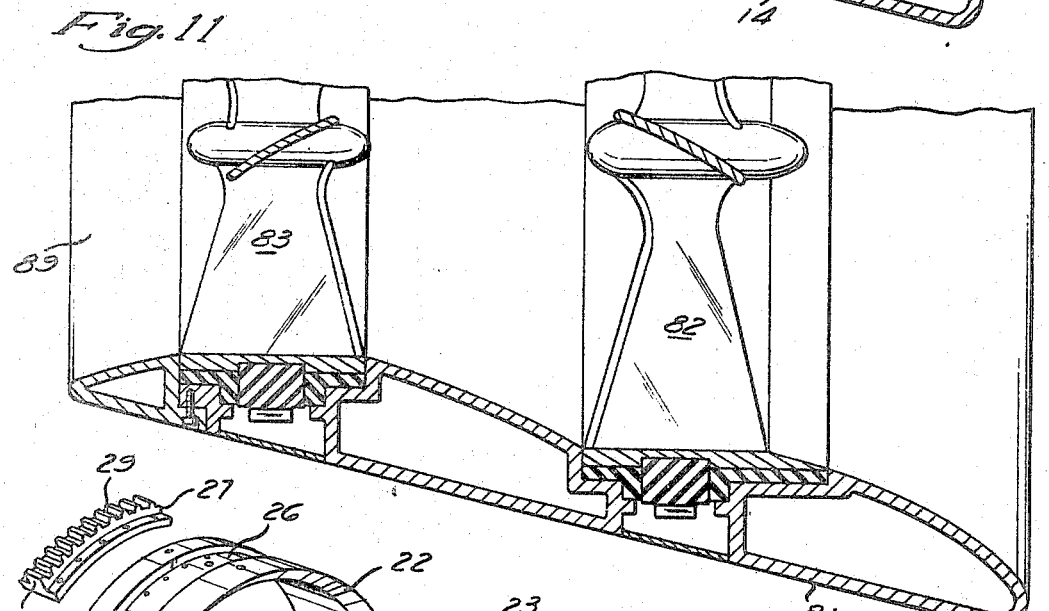
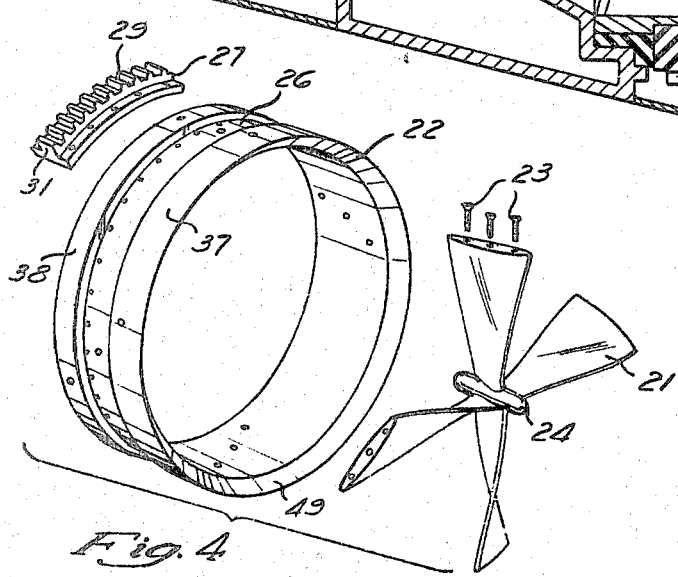
INVENTORS
J. GLENN SATTERTHWAITE,
& JAMES B. MACY JR.
BY
McNENNY, FARRINGTON,
PEARNE, & GORDON
ATTORNEYS

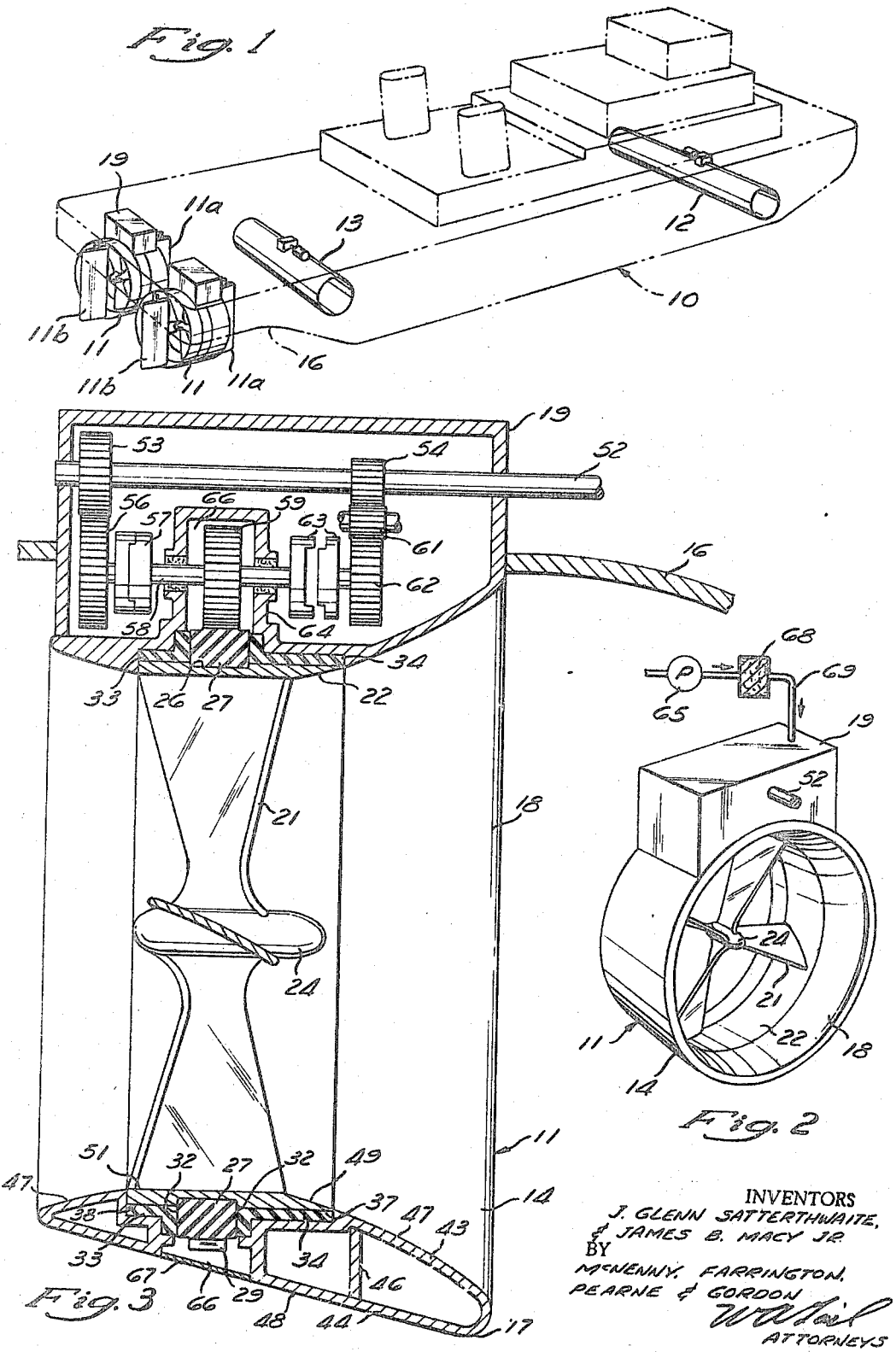

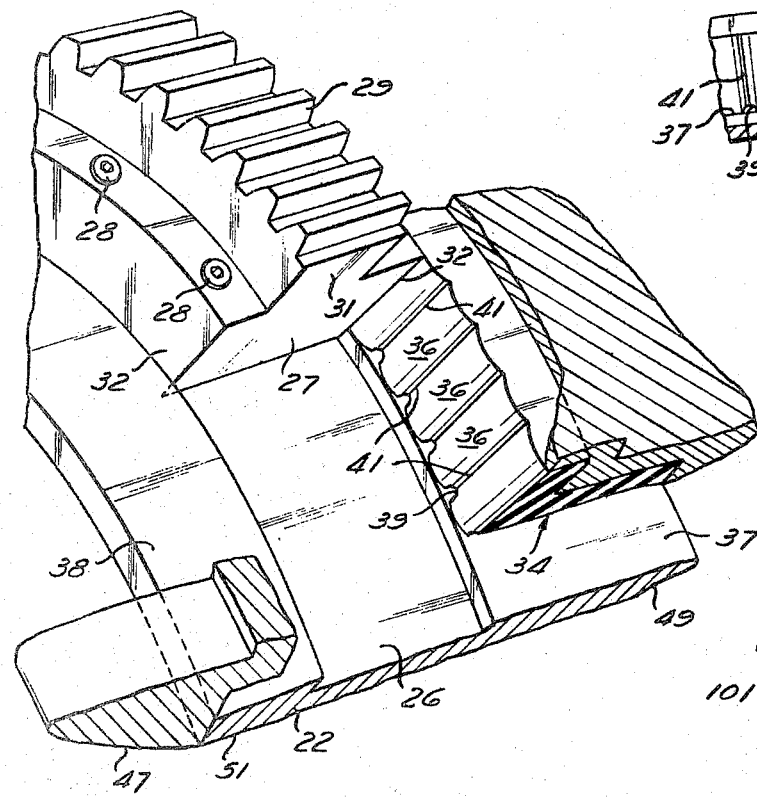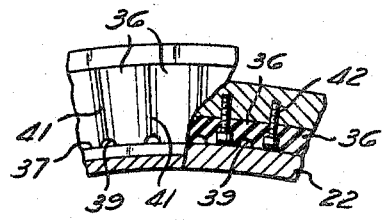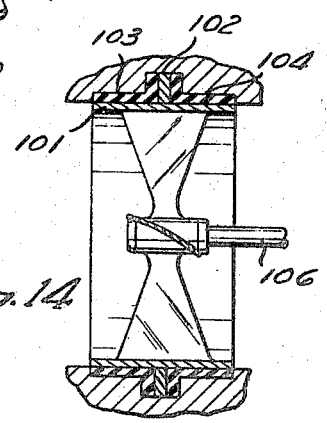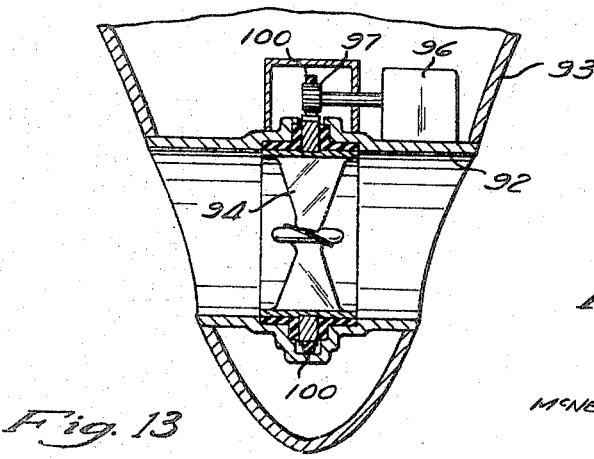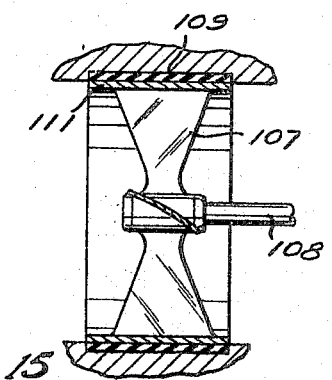

Jan. 6, 1970 J. G. SATTERTHWAITE ET AL 3,487,805
PERIPHERAL JOURNAL PROPELLER DRIVE
Filed Dec. 22, 1966 4 Sheets-Sheet 4
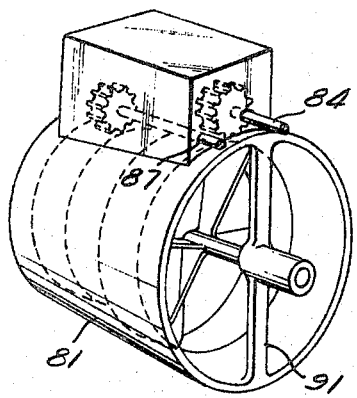
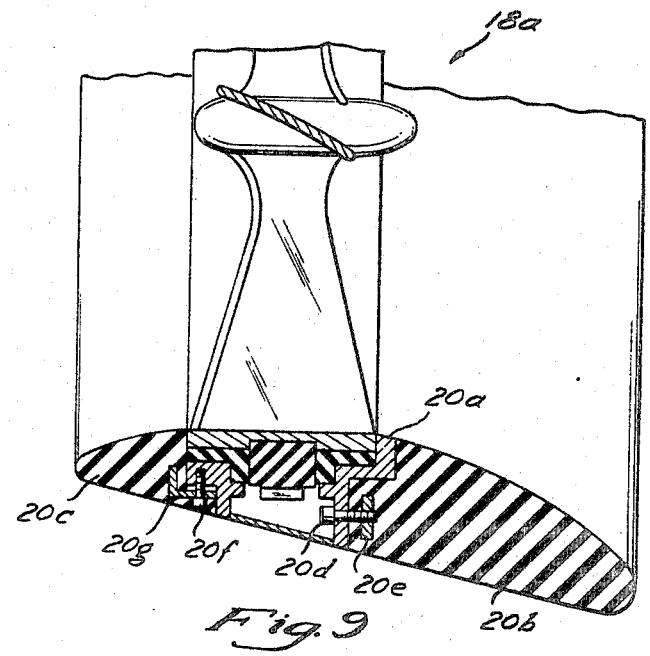
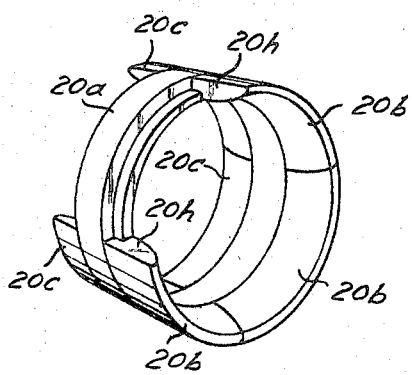
INVENTORS
J. GLENN SATTERTHWAITE,
& JAMES B. MACY JR.
BY
McNENNY, FARRINGTON, PEARNE, & GORDON
ATTORNEYS United States Patent Office 3,487,805
Patented Jan. 6, 1970

3,487,805
PERIPHERAL JOURNAL PROPELLER DRIVE
James Glenn Satterthwaite, 1 Dogwood Trail, Chesapeake,
Va., and James B. Macy, Jr., 107 Holly Lane, Morehead City, N.C. 28557
Filed Dec. 22, 1966, Ser. No. 603,817
Int. Cl. B63h 5/06
U.S. Cl. 115—42
30 Claims

ABSTRACT OF THE DISCLOSURE

A ship's propulsion system wherein propellers are peripherally journaled in water lubricated rubber bearings within a duct or nozzle. A water lubricated peripheral drive provides speed reduction remote from the ship's power plant permitting use of small diameter, high speed drive shafting. Tandem nozzles within a single unit housing are each provided with peripherally mounted and driven propellers to improve operating efficiency. The nozzles may be formed with rubber sections which are capable of deflecting when foreign articles are encountered to prevent damage to the nozzle system. The low coefficient of friction of rubber nozzles reduces frictional losses.

BACKGROUND OF INVENTION

This invention relates generally to the mounting and driving of propellers and, more particularly, to a novel and improved propulsion system wherein a propeller is located within a duct or nozzle and is journaled and driven at its periphery.

When a propeller rotates in a fluid, it produces thrust by accelerating a mass of fluid along the axis of the propeller rotation. The efficiency of the propeller is determined by the ratio of thrust power produced by the system to power input to the system. In any installation, where a ship's propeller operates in the open, or unshrouded condition, a number of power losses occur. A clearer understanding of the principal benefits derived from this invention may be obtained by considering the power losses in six general categories.

A first category is the power loss resulting from race contraction of the propeller slipstream. This loss is proportional to the sternward acceleration of the fluid acted upon by the propeller. Such sternward acceleration is commonly referred to as "true slip." The second category is the power loss caused by recirculating or turbulent flow of the fluid from the drive face of the blade to the back face thereof around the tip or end of the propeller blade. The third category is the power loss resulting from the whirling action of the propeller around its axis of rotation, due to propeller shaft deflections under propeller end loads. The fourth category is the power loss resulting from the rotary or tangential fluid movement about the axis of propeller rotation. This loss is produced at least in part by the frictional drag of the propeller blades. The fifth category is the power loss produced by drag of the outboard shafting, bearing support struts, and other outboard structural members of the propeller system. The sixth category is the kinetic energy power loss resulting from the axial acceleration, or true slip, of the fluid acted upon by the propeller. This loss increases as the sternward velocity or true slip of the fluid increases. Since some slip is required to produce thrust or a driving force, this loss is always present and is the principal loss encountered. It is recognized that these categories are interrelated and that they do not include all of the losses present. They do, however, provide a simplified analysis which will assist in the understanding of the principal benefits derived from this invention.

Nozzles or shrouds are used to eliminate or minimize the loss in the first category due to propeller race contraction resulting from axial acceleration of the fluid at high slips. In such installations it has been the general practice to construct the nozzle as a part of the ship's hull and to position the propeller within the nozzle using a centrally located propeller shaft and struts for the drive and support of the propeller. In such installations it is necessary to provide clearance between the tips of the propeller blades and the inner wall of the nozzle. Consequently, only suppression of the race contraction occurs and the other categories of loss remain. In addition, erosion tends to occur in the blade tip and nozzle throat areas. Further, the propeller drive is not simplified in that the typical inboard reduction gearing and large diameter, high torque shafting systems normally required in most ships are retained.

In the past, various systems have been proposed to improve the performance of the propeller and to simplify the drive mechanism. In some instances such systems have included a propeller having a peripheral rim wherein the propeller is supported in peripheral bearings engaging and supporting the rim, and wherein torque for driving the propeller is applied through the rim. Although such systems potentially provide higher propeller efficiency and potentially can utilize simplified drive systems, they have not resulted in general acceptance principally because of their failure to provide satisfactory radial and axial support, and because of their failure to provide a satisfactory method of lubrication for the bearings and drives.

SUMMARY OF INVENTION

In a first embodiment incorporating the present invention a water-lubricated rubber bearing is mounted in the nozzle housing to engage a peripheral ring on the propeller and a water-lubricated rubber gear drive system is provided to apply the torque to the propeller rim. The rubber bearings provide the full axial and radial support. Since water is used to lubricate both the gear drive and the rubber bearing surfaces, ideal lubrication is easily obtained and maintenance problems are minimized. Such a system provides a practical structure for obtaining the maximum advantages of shrouding because tip clearance is eliminated and the losses of the second category are minimized. The propeller is supported to that the whirling loss of the third category does not occur. Also erosion in the blade tip and nozzle throat areas cannot occur. Still further, the drive provides any desired speed reduction at the propeller rim, remote from the power plant. This permits the use of small size, high speed, inboard shafting to transmit the required power to the propeller. Consequently, losses of the fifth category resulting from outboard shafting and strut supports are eliminated completely.

Ships normally must be capable of operating without undue bearing damage in dirty water of the type occurring in harbors, rivers, or the like. Therefore, the first embodiment of this invention provides a propulsion system with a water chamber open to the propeller bearings and drive gearing arranged so that clean domestic water or filtered environmental water can be supplied to the water chamber at a sufficiently high pressure to prevent the ingress of dirty water or other bearing damage materials. Generally, when the ships are operated at sea, or in relatively clean bodies of water, the clean domestic water supply system for the water chamber is not required and the chamber is opened to and supplied with clean water directly from the environment.

Water lubricated rubber bearings are ideally suited for the peripheral mounting of the propeller to provide both radial and axial support, since they produce lower friction when the surface velocity within the bearing increased and function best when the bearing load per unit area is low.

In a system incorporating the present invention, the bearings are necessarily large in diameter and surface area since they engage the peripheral rim of the peripheral rim of the propeller. Therefore, the surface velocity for a given propeller diameter and propeller speed is much higher than those encountered with conventional shaft bearings located within the central propeller hub area. Also, such large diameter bearings provide a large bearing surface area even in axially short bearings. Therefore, bearing pressures are low and the rubber bearings operate efficiently with a minimum of friction, wear, and maintenance.

In the first embodiment, a ring gear is provided around the propeller rim and is formed with spur gear teeth along its periphery. The ring gear teeth are formed of hard rubber and mesh with one or more spur gear drive pinions journaled in the upper inboard nozzle framework. Preferably, the pinion gears are formed of corrosion-resistant metal such as stainless steel. Such a structure, utilizing rubber gear teeth, operates at extremely low frictional losses due to the very low coefficient of friction present when wetted metal engages rubber. Also, relatively high levels of horsepower can be transmitted since the torque is applied at the maximum radius. At peak loads rubber gear teeth deflect to a slight degree and several teeth are in simultaneous contact cooperating to transmit the required torque.

Similar results may be obtained by using a belt drive system, wherein belts of gear-like configuration, or V-belts may be employed to apply torque to the propeller rim. In such an arrangement the distance between center lines of the propeller ring gear and pinion are not necessarily related to speed reduction, since they do not directly intermesh. Also, the applied torque is distributed around a large arc of the propeller rim with resultant lower load at any given point on the rim periphery.

A propulsion system utilizing propellers which are peripherally journalled and peripherally driven is particularly suited for the main propulsion of ships because of the high efficiencies obtainable. Such systems are also particularly suited due to their structural simplicity for use in bow and stern thrusters for ships and in pipeline pumping installations.

Several structural variations of the first embodiment are illustrated. These variations include several nozzle structures and several propeller mounting and drive arrangements.

In one of its broader aspects the present invention provides improved steering. Tow boats engaged in tows of great length, such as barge trains and the like, must be equipped with extra steering power to facilitate maneuvering ability around sharp bends in the waterways. In addition to the regular steering rudder positioned approximately amidship aft the propeller, twin rudders are also use ahead of the propeller flanking the propeller shaft. They are commonly referred to as "flanking rudders." The presence of a conventional propeller shaft requires that twin rudders be employed since the propeller shaft precludes the installation of a single forward rudder in the amidship position. Flanking rudders introduced double interference to the streamline flow of water immediately ahead of the propeller and produce excessive frictional drag. By eliminating the central propeller shaft and utilizing peripheral drive it is practical to locate a single forward rudder at the center of the nozzle similar to the after steering rudder. This minimizes both the obstructions to flow and frictional drag losses. Consequently, the overall propulsion efficiency is substantially improved without sacrifice of steering ability and initial construction cost is reduced.

In another of the broader aspects of this invention a substantial portion of the nozzle is formed of rubber. Because of its extremely low friction in water a nozzle having a rubber surface provides a minimum frictional drag loss. In the illustrated nozzle constructed primarily of rubber the forward and exit proportions of the nozzle are provided by molded rubber sectors which cooperate when installed to define the generally circular entrance and exit sections of the nozzle. Because rubber can be molded with a high degree of precision such nozzles can be accurately shaped with a minimum of cost. Also, the inherent flexibility of the rubber provides a structure wherein nozzle damage does not occur when the nozzle encounters foreign objects often present in waterways and harbors.

The sectors are provided with axially extending, interengaging, radial faces so that the assembled structure constitutes an arch which is capable of withstanding relatively large, inwardly directed radial forces. Since the flow through the nozzle occurs at a higher velocity than the flow around the nozzle inward hydraulic forces are developed under operating conditions. Consequently, the arch structure of the assembled nozzle is loaded inwardly. Therefore, mounting of the nozzle sectors at only one end provides all the structural strength required.

With a second illustrated embodiment of this invention still higher system efficiencies are obtainable. It has been known in the past that higher system efficiencies can be obtained with counter rotating tandem propellers. However, such systems have not been used in the past because tandem propeller systems have required impractical drive and bearing structures. For example, if central drive shafting were used it would be neccessary to provide counter rotating concentric shafts and very complicated bearing structures.

The illustrated second embodiment of this invention provides two counter rotating propellers mounted in individual tandem nozzles located in a unit nozzle housing. The propellers are peripherally journaled and driven. Such peripheral mounting and driving is particularly advantageous since it provides a simple practical structure and since separate parallel spaced drive shafts can be used. In a given system operating at a given thrust, each of the tandem propellers operates at a lower slip than a comparable single propeller system, thus minimizing the acceleration, or true slip losses of the sixth category. Consequently, each tandem propeller operates at higher efficiency and the system efficiency is improved. Also, when the two propellers are rotated in opposite directions the rotary losses of the fourth category are minimized. In such a system the tangential effect of the forward propeller tends to cancel the tangential effect of the after propeller and the fluid discharge from the after nozzle is accelerated only in an axial direction. Since axial acceleration is the sole source of thrust, higher system efficiencies result.

Optimum efficiency results in the tandem nozzle when the propellers are sized and driven so that the hydrostatic pressure at the discharge end of the after nozzle. When this occurs, the power boost supplied to the fluid through increased torque to the forward propeller, is efficiently transmitted to the after propeller and therethrough to the exit of the propulsion system.

With the system so arranged, the induced static pressure between the propellers is dissipated as the fluid passes through the after propeller, wherein a portion of the power supplied to the forward propeller assists in driving the after propeller with minimum velocity interference and frictional losses. Therefore, a considerable improvement in the efficiency of the after propeller and in the efficiency of the system is provided. Such operating conditions with increased hydrostatic pressure between the propellers is possible with the second embodiment of this invention since the slipstream from the forward propeller is totally confined by the nozzle structure.

It should be understood that in its broader aspects this invention includes tandem nozzle structures wherein the propellers may be rotated in the same direction and wherein the system is constructed so that one propeller is peripherally journaled and driven while the other propeller is supported or driven by a central shaft. Still further, this invention may be embodied in a tandem nozzle system wherein more than two propellers are mounted within a single compound nozzle structure.

Tandem nozzle propulsion systems incorporating this invention are particularly advantageous on tow boats or other similar vessels which must operate at high slip conditions to meet thrust demands with limited diameter propellers. With a tandem propeller system incorporating this invention such ships can be operated at higher system slips than has been practical in the past, since the tandem propeller system provides higher operating efficiency. Alternatively a tandem system incorporating this invention can be operated at the same slip level previously used with savings of power and fuel. Such systems are particularly important where draft limitations determine propeller diameter and also the slip level at which a propeller must operate to develop the required thrust. Further, large high speed displacement hulls, such as tankers, which also must utilize high propeller loads receive benefits from the tandem nozzle.

It is an important object of this invention to provide a novel and improved propulsion system wherein the propeller is provided with a peripheral rim journaled within a duct or nozzle in water-lubricated rubber bearings.

It is another important object of this invention to provide a novel and improved propulsion system according to the preceding object wherein the propeller is driven by water-lubricated peripheral drive gearing.

It is another important object of this invention to provide a propulsion system wherein a propeller is driven by a water-lubricated peripheral drive providing speed reduction outboard of the ship's main hull and remote from the power plant.

It is another important object of this invention to provide a propulsion system according to the last preceding object wherein such drive includes a propeller rim having water-lubricated gear teeth driven by a metal pinion.

It is still another important object of this invention to provide a novel and improved propulsion system including a propeller peripherally driven by water-lubricated drive means providing substantial speed reduction adjacent to the propeller wherein the drive means includes a drive pinion connected to a peripheral rim on the propeller by means of a belt.

It is still another object of this invention to provide a novel and improved propulsion system including a nozzle having sections constructed of molded rubber attached to a central structural framework.

It is still another object of this invention to provide a novel and improved propulsion system wherein at least a pair of tandem, axially spaced propellers each having a peripheral rim are journaled on such rims within a single duct or nozzle housing and wherein separate peripheral drive means are provided for each propeller to drive the propellers in opposite directions at desired relative speeds.

Further objects and advantages will appear from the following description and drawings wherein—

FIGURE 1 is a schematic illustration of a typical towboat provided with main propulsion and thrusters in accordance with a first embodiment of this invention;

FIGURE 2 is an enlarged perspective view of one of the main propulsion systems;

FIGURE 3 is an enlarged longitudinal section of the propeller system illustrated in FIGURE 2;

FIGURE 4 is an exploded perspective view of the propeller assembly;

FIGURE 5 is an enlarged fragmentary perspective view of the ring gear and peripheral bearing structure;

FIGURE 6 is a fragmentary view, partially in section, illustrating the mounting of the rubber segmental stave bearings;

FIGURE 7 is a fragmentary longitudinal section of a modified form of the first embodiment wherein the propeller may be installed or removed from the rearward end of the nozzle;

FIGURE 8 is a schematic perspective view of a nozzle having sections formed of rubber sectors with parts removed for purposes of illustration;

FIGURE 9 is a fragmentary longitudinal section of a nozzle of the type illustrated in FIGURE 8 showing the mounting of the rubber sectors;

FIGURE 10 is a schematic perspective view of a main propulsion nozzle incorporating a second embodiment of this invention wherein tandem counter-rotating propellers are mounted in the nozzle;

FIGURE 11 is an enlarged fragmentary longitudinal section of the second embodiment illustrating the structural detail of the propeller mounting;

FIGURE 12 illustrates a modified form of the second embodiment wherein the propellers are journaled on central bearings and are peripherally driven;

FIGURE 13 is a schematic illustration of a first embodiment propeller mounted on the bow thruster of a typical ship wherein the peripheral drive includes a belt;

FIGURE 14 is a modified form of the first embodiment wherein a central shaft is utilized to drive the propeller; and FIGURE 15 is a modified form of the first embodiment wherein the propeller is driven and axially located by a central drive shaft and is radially located by a peripheral rim bearing.

FIGURE 1 is intended to illustrate how propeller systems incorporating the present invention can be used for both the main propulsion and for bow and stern thrusters. The phantom portion of the figure is intended to schematically represent a towboat 10 having two similar main propulsion propeller nozzle assemblies 11 at its stern, a bow thruster 12, and a stern thruster 13. Forward and stern rudders 11a and 11b, respectively, are centrally mounted adjacent to each nozzle assembly. It should be understood that this type of boat is illustrated only by way of example and that propeller systems incorporating this invention may be used on substantially all types of powered ships. Further, it should be understood that the invention may be applied, on any given ship, to only the main propulsion or only to thrusters and need not be applied to both.

FIGURES 2 through 6 all disclose one preferred form of the propeller assembly 11. In this first embodiment, the nozzle 14 is mounted at the stern of the ship in such a manner that it projects below the adjacent portions of the hull 16. Normally the hull and nozzle are sized and arranged so that the lowermost portion 17 of the nozzle 14 does not project below the lowermost sections of the hull. The hull should be shaped so that an approach section is provided which produces a maximum flow of water into the entrance 18 of the nozzle 14 as the ship moves through the water.

Mounted on the upper side of the nozzle 14 is a boxlike frame structure 19 which projects into the interior of the hull 16 to provide a supporting structure for the nozzle 14 and also a supporting structure for the drive gearing. In this illustrated embodiment, a four-bladed propeller 21 is mounted within a rim 22 by means of bolts 23 which extend radially through the rim 22 and are threaded into the ends of the propeller blades (see FIGURE 4). The central hub 24 is sized to provide a minimum of drag since it does not transmit torque.

The rim 22 is formed with an annular exterior groove 26. Positioned in this groove are a plurality of arcuate gear sectors 27 which are removably secured to the ring by bolts 28 (see FIGURE 5). A plurality of similar gear sectors 27 are bolted around the rim 22 and cooperate when all of them are installed to form a continuous flange extending completely around the rim. Each of the gear sectors 27 is formed with spur-gear teeth 29 shaped and sized so that the teeth on one sector cooperate with the teeth on the other sectors to form a ring gear extending completely around the rim. The gear portion 31 of each sector 27 is inset from the radial side faces 32 to facilitate the insertion of the bolts 28.

The rim and segments are journaled in water-lubricated rubber bearing assemblies 33 and 34 which are in turn mounted in the frame of the nozzle 14. The bearing ring 34 is formed of a plurality of similar L-shaped bearing staves 36 which cooperate to form an annular bearing extending completely around the rim. The axial leg of the staves 36 engages the forward cylindrical portion 37 of the rim 22 and the radial leg engages the radial face 32 of the assembled segments 27. The bearing ring 33 is also formed with a plurality of similar L-shaped staves which again cooperate to provide a ring around the rim 22 with the axial legs of the staves engaging the rearward cylindrical portion 38 of the rim 22 and the radial legs engaging the rearward radial face 32 of the gear sectors 27. The two bearing rings 33 and 34 therefore provide the radial support for the rim 22 and through the engagement with the opposed radial surfaces 32 on the assembled sectors 27 axially support the rim within the nozzle.

The radial end faces of the staves are preferably formed with convex surfaces to provide maximum lubrication. This arrangement provides radially extending water passages 41 to insure a proper lubrication supply along the radial faces. As best illustrated in FIGURE 6, axial grooves 39 are formed by recesses along the inner wall of the staves to provide water lubrication of the cylindrical surface 37 and 38. These axial grooves 39 each connect with the radial passages 41 to insure full lubrication to all bearing surfaces. The staves 36 are removably mounted in the nozzle 14 by bolts 42, as illustrated in FIGURE 6.

The nozzle 14 may be constructed in any suitable manner and is schematically illustrated may include an inner wall 43 and a spaced outer wall 44 strengthened by suitable struts or ribs 46. Preferably, the inner surface 47 of the inner wall 43 is shaped to provide a flow pattern through the nozzle which produces the maximum efficiency under the normal service conditions of operation of the ship. Similarly, the outer surface 48 of the outer wall 44 should be shaped so that the nozzle produces the desired streamline flow under normal operating conditions.

In the form illustrated in FIGURE 3, the forward inner surface 49 of the propeller rim 22 flares outward to a relatively sharp edge and blends with the inner surface 47 of the adjacent portions of the nozzle. Similarly, the rearward inner surface 51 of the propeller rim 22 blends with the adjacent portions of the inner surface 47 so that the inner wall of the rim 22 and the inner surface 47 of the nozzle cooperate to provide a smooth surface of the desired nozzle shape.

One typical drive system which may be used includes a drive shaft 52 extending into the gear and support frame 19 provided with a main drive gear 53 and a reverse drive gear 54. The main drive gear on the drive shaft 52 is connected through a gear 56 and clutch 57 to a shaft 58 supporting a drive pinion 59. The drive pinion in turn meshes with the teeth 29 on the sectors 27. The reversing gear 54 connects with the shaft 58 through a reversing gear 61, a gear 62, and a clutch 63. The clutches 57 and 63 are arranged so that only one is engaged at a time. The clutch 57 is engaged for forward drive and the clutch 63 is engaged for reverse drive.

The nozzle housing is arranged with an enclosure 64 for the drive pinion 59 which is in communication with and constitutes a portion of a lubrication chamber 66. This chamber extends completely around the nozzle and is open to all portions of the two bearing assemblies 33 and 34 and to the drive pininon 59. The chamber 66 is filled with water and provides the water lubrication for the gear drive and the rubber bearings. The chamber 66 is supplied with clean water through a suitable system such as the system schematically illustrated in FIGURE 2. This system includes a pump 65 and a filter 68 connected by a line 69 to the chamber 66. In such a system the environmental water around the ship is pumped through the filter and delivered to the chamber 66 at a pressure sufficiently high to insure that unfiltered environmental water will not ingress to the chamber 66 and the bearing area. Suitable seals (not illustrated) may be provided between the rim 22 and the nozzle to control or minimize leakage of lubrication water from the chamber 66. In some instances, clean water may be provided on the ship as a supply to be used for the lubricating purposes. In that event, the filter need not be used. Also, it is preferably that when the ship is operating in a clean body of water, for example the ocean or in rivers or lakes where the water is clean, the chamber 66 is opened directly to unfiltered water from the environment.

In order to permit the assembly and disassembly of the system, a removable panel 67 is provided as a partial enclosure of the chamber 66. The panel 67 has a length at least as long as a single gear sector 27 so that removal of the panel 67 permits the installation or removal of gear segments. When it is desired to remove the propeller, the panel 67 is removed and the gear sectors are individually removed by removing one sector and then turning the propeller to bring the next sector into alignment with the panel opening so that it may be removed. This process is repeated until all of the sectors are removed. The propeller and rim are then free to slide forward out of the nozzle. The reverse procedure is followed for reinstallation of the propeller. Worn bearing staves can, of course, be replaced while the propeller is out of the nozzle.

FIGURE 7 discloses a modified form of the first embodiment of this invention. In this form the propeller may be removed rearwardly of the nozzle by removing an annular back piece 71 and removing the gear sectors 27 through an opening provided by the removable panel 67. When the gear sectors are removed and the back section 77 is removed, the rim is free to slide rearwardly of the nozzle. In this embodiment, the rim is cylindrical and the nozzle assembly is recessed so that the inner surface of the rim is again flush with the adjacent surfaces of the nozzle.

Because the shaft 52 is located entirely within the hull, there is no exterior drag created by the drive shafting. In most instances the drive pinions 59 are located at the top of the nozzle so that the lateral thrust on the propeller produced by the driving torque is in a horizontal direction. With such an arrangement the lateral forces created by driving do not add to the gravity produced pressure on the lower side of the bearing. Therefore, the distribution of bearing pressures tends to occur in the most uniform pattern regardless of the direction of propeller rotation. In any event, it is preferable to locate the drive in the upper section of the nozzle within 30° of the top.

In some larger installations where large amounts of power are required, two or more drive pinions 59 are provided at spaced points along the periphery of the rim. With such an arrangement the tooth load is reduced for a given total power requirement. In such installations the multiple drive pininons 59 are powered by a single drive shaft 52 or are powered, if desired, by separate drive shafts 52. Such multiple pinion drives may be symmetrically located so that torque induced lateral forces on the propeller cancel each other. However, if encosed drive shafts are desired, the drive pinions are preferably positioned symmetrically with respect to the top of the nozzle.

The illustrated gear sectors 27 are molded from a hard rubber and the drive pinion 59 is formed of a corrision resistant metal such as stainless steel. With such an arrangement, the wetted metal surface of the pinion has a very low friction with the rubber teeth on the gear segments. A similar low friction can be obtained by utilizing metal gear sectors 27 running with a rubber pinion gear 59 or by forming either the gear sectors 27 or the pinion gear 59 with a metallic core and rubber-coated teeth bonded thereto. It should be understood that materials having similar properties to rubber, even though they may not be natural or synthetic rubber per se, may be substituted for the rubber bearings and gears. The term rubber as used herein includes natural and synthetic rubber or elastomeric material and also such other materials with similar properties.

FIGURES 8 and 9 illustrate a modified form of nozzle structure. This nozzle includes a central support ring 20a which is mounted on the ship's hull by a mounting frame (not shown). The entrance portion of the nozzle 18a is provided by solid rubber sectors 20b. In the illustrated structure there are four sectors 20b which cooperate when they are mounted on the support ring 20a to define a circular nozzle of the desired shape. The rearward end of the nozzle is also formed in a similar manner by four solid molded rubber sectors 20c. The forward sectors are mounted on the support ring 20a by bolts 20d which thread into mounting plates 20e molded into the sectors. The rearward sectors 20c are also bolted in place with bolts 20f which extend through mounting plates 20g into the support ring 20a.

There are a number of advantages derived from a nozzle constructed in this manner. Rubber has an extremely low coefficient of friction in water so the drag losses of this system are substantially reduced. Also, it is possible to mold the rubber with a high degree of precision so the nozzle can be easily formed with exactly the desired shape. In addition, such nozzle is substantially immune to damage when the nozzle strikes a foreign object such as a log or the like. The rubber sectors provide sufficient resiliency to absorb the impact of striking such foreign object and snap back to their original shape, so that the nozzle is not damaged and nozzle efficiency is not impaired. Preferably, the sectors are formed of rubber having a hardness between eighty and ninety on the Shore C scale.

The sectors are provided with axially extending interengaging radial faces 20h so they form an arch-like structure capable of withstanding large inward radial forces. When the propeller is operating the velocity of the fluid flowing through the nozzle exceeds the velocity of the fluid flowing around the nozzle, so a lift or radially inward hydrostatic force is developed. Since the arch structure is capable of sustaining large forces of this nature the simple end mounting illustrated provides all of the structural strength required for the mounting of the sectors.

FIGURES 10 and 11 illustrate a second embodiment of this invention wherein two counter-rotating axially spaced tandem propellers are mounted within a single compound nozzle 81. In the illustrated embodiment the forward propeller 82 has a structure and mounting similar to the form illustrated in FIGURE 3. This propeller is assembled and removed through the forward end of the nozzle 81. The rearward smaller propeller 83 is structurally similar to the form of the first embodiment illustrated in FIGURE 7 and is removable through the rearward end of the nozzle. Both of the propellers 82 and 83 are journaled in peripheral water-lubricated rubber bearings and are peripherally driven by water-lubricated gearing of the same type discussed above in connection with the first embodiment.

A first drive shaft 84 is connected to peripheral gearing 86 to drive the first propeller 82 and the second drive shaft 87 is connected to peripheral gearing 88 to drive the second propeller 83. The drives are arranged to rotate the propellers in opposite directions at different speeds. Preferably the drives are arranged to permit separate adjustment of the speeds of the two propellers so that the maximum efficiency can be obtained for any given operating condition.

In this embodiment the water discharged from the first propeller 82 has a rotary component of movement around the axis of rotation of the propeller 82. The rate of such rotation is determined by friction, slip, and various other operating conditions. The second propeller 83 is sized and operated at a speed so that the water exiting from the second propeller 83 through the rearward end 89 of the nozzle 81 is substantially free of rotary movement.

The highest system efficiencies result when the two nozzles and their respective propellers are sized, shaped and driven so that the hydrostatic pressure of the water leaving the forward propeller 82 is higher than the hydrostatic pressure of the water at the exit end of the nozzle. Under such operating conditions friction loses are minimized since the power supplied to the water by the first propeller is most efficiently transported to the after end of the system. With this arrangement a portion of the frictional drag of the second propeller 83 is overcome by power supplied by the first propeller. The operation of the propulsion system in this manner is possible because the entire slipstream from the first propeller is enclosed by the nozzle structure as the slipstream passes from the forward to the after propeller.

It should be understood that a tandem nozzle system incorporating this invention in its broader aspects includes systems wherein more than two propellers and nozzles are provided and wherein counter rotation of the propellers is not used. However, highest efficiency will be achieved with counter rotating propellers since any rotary movement of the water passing through the exit end 89 of the nozzle constitutes a power loss which does not produce thrust. By utilizing counter rotating propellers to eliminate or minimize such rotary movement, the overall system efficiency is increased and a maximum amount of thrust is obtained for a given input power.

FIGURE 12 illustrates a modified form of the second embodiment wherein a strut 91 is provided at each end of the nozzle and the propellers are centrally supported on shaft extensions journaled in the support struts. The struts may be removably mounted on the nozzle in those structures where the propeller installation and removal requires the removal of the strut or struts. In this modified form of the invention the peripheral water-lubricated drive is retained.

FIGURE 13 is a schematic illustration of a preferred form of bow thruster. A lateral duct or tube 92 is mounted in the hull 93 and is open to opposite sides of the ship. A peripherally journaled and peripherally driven propeller 94 is located within the duct with rubber bearings providing both radial and axial support. A motor 96 is mounted on the duct 92 and directly coupled to a driven pinion 97 to provide the power for driving the propeller. The power is transmitted to the rim of the propeller through a belt 100 having teeth on its inner side which mesh with teeth on the rim and pinion. Here again, the bearings for peripherally mounting the propeller 94 are water-lubricated rubber bearings and a water-lubricated drive is used. The motor 96 may be of any suitable type such as a hydraulic or electric motor but if it is directly connected it must be a reversible motor. In a pipe line installation a similar structure may be used and in such installation a reversible motor is normally not required.

FIGURE 14 schematically illustrates another modified form of this invention. In this form of the invention the propeller is provided with a rim 101 having a radial flange 102 secured thereto. Water-lubricated rubber bearings 103 and 104 engage the rim 101 to provide radial support for the propeller and engage opposite sides of the flange 102 to provide axial support. In this embodiment, however, a propeller shaft 106 is used to drive the propeller. In this form of the invention the drive shaft must extend through the fluid so drive shaft drag is present. However, high efficiency is still obtained because of the low friction of the bearings within the shrouding of the propeller and because outboard struts and bearings to support the propeller are eliminated.

In FIGURE 15 still another form is schematically illustrated. In this form, a propeller 107 is driven by a centrally located shaft 108 and is radially supported by water-lubricated rubber bearings 109 which engage the peripheral ring 111. In this instance, however, the axial location of the propeller is determined by the drive shaft 108 rather than by a peripherally mounted radial flange or the like.

In a propeller system incorporating the various illustrated forms of this invention, improved efficiencies are obtained since the propeller is peripherally supported by a rim extending completely around the propeller. Consequently, the tip losses are eliminated. Also errosion does not occur adjacent to the tips. Because of the extremely low friction present in water-lubricated bearings and the structural simplicity of such bearings, these benefits are achieved with a practical structure having a relatively low initial cost. When water-lubricated peripheral support is combined with the peripheral drive still further benefits are achieved. Such system is also particularly suited for the high efficiency tandem nozzle system incorporating counter-rotating multiple coaxial propellers located in a single unit nozzle housing.

Although preferred embodiments of this invention are illustrated, it is to be understood that various modifications and rearrangements of parts may be resorted to without departing from the scope of the invention disclosed.

What is claimed is:

1. A propeller system comprising a tubular duct defining a flow passage, a propeller assembly provided with a peripheral rim the interior surface of which defines a portion of the wall of said passage, a rubber bearing mounted in said duct engaging and supporting the outer surface of said rim, said rubber bearing being formed with peripherally spaced passages open to said rim through which water flows to provide lubrication between said bearing and said peripheral rim, said duct being formed with a water chamber in communication with all of said passages for supplying water lubrication to said entire rubber bearing, and water-lubricated drive means in said chamber for applying rotary torque to said rim.

2. A propeller system as set forth in claim 1 wherein said drive means includes a drive pinion connected to apply torque to said rim with a substantial speed reduction between said pinion and rim.

3. A propeller system as set forth in claim 2 wherein pinion is a gear, and said rim is provided with a peripheral ring gear, at least one of said ring gear or said pinion gear being formed with a rubber surface.

4. A propeller system as set forth in claim 2 wherein said drive means includes a drive belt connecting said pinion to said rim.

5. A propeller system as set forth in claim 1 wherein said propeller system is adapted to operate with water flowing through said duct, and supply means are connected to supply substantially clean water to said chamber at a pressure greater than the pressure of water flowing through said duct.

6. A propeller system comprising a tubular duct defining a flow passage, a propeller assembly provided with a peripheral rim the interior surface of which defines a portion of the wall of said passage, a rubber bearing mounted in said duct engaging and supporting the outer surface of said rim, said duct being formed with a water chamber in communication with said bearing for supplying water lubrication to said entire rubber bearing, said rim being formed with a radial flange projecting beyond a cylindrical outer surface of said rim, said flange providing a radial surface, and said rubber bearing engages said cylindrical surface on said rim and said radial surface to radially and axially locate said propeller assembly within said duct.

7. A propeller system as set forth in claim 6 wherein said flange is centrally spaced from the ends of said rim and provides opposed radial surfaces, said rim is provided with a cylindrical surface on each side of said flange, and said rubber bearing includes two annular assemblies each engaging one cylindrical surface and the adjacent radial surface, each annular assembly including a plurality of similar stave elemets removably mounted in said duct.

8. A propeller system as set forth in claim 7 wherein each stave is substatially L-shaped having one leg providing a bearing surface engaging with the cylindrical surface and the other leg providing a bearing surface engaging a radial surface, said duct being shaped to support both legs of each stave.

9. A propeller system as set forth in claim 8 wherein said radial flange is formed of a plurality of similar, arcuate segments removably secured to said rim and cooperating with each other to provide an annular flange extending completely around said ring, and said duct is provided with a removable cover sized to proivde access for mounting and removal of at least one of said segments, said cover defining at least part of said chamber.

10. A propeller system as set forth in claim 9 wherein said segments are provided with gear teeth, cooperating to provide a ring gear around said rim, and a water-lubricated drive pinion is provided with teeth meshing with said ring gear.

11. A propeller system as set forth in claim 9 wherein a drive pinion is provided and a drive belt extends around said drive pinion and said flange.

12. A propeller system comprising a tubular duct, a propeller provided with a peripheral rim, a water-lubricated rubber bearing mounted in said duct engaging and radially supporting the outer surface of said rim, said rubber bearing including a plurality of rubber stave members removably mounted in said duct cooperating to form a bearing extending entirely around said rim, and drive means connected to rotate said propeller, said duct being formed with a water chamber in communication with all portions of said bearing and substantially isolated from the interior of said duct, and means are provided to supply clean water to said chamber.

13. A propeller system as set forth in claim 12 wherein a flange is mounted on said rim intermediate its ends to provide opposed radially extending surfaces, said bearing engaging said opposed surfaces to axially locate said propeller.

14. A propeller system as set forth in claim 13 wherein said flange is formed of removable segments; said duct, rim and bearing being formed so that said rim is removable axially along said duct after said segments are removed from said rim.

15. A propeller system as set forth in claim 14 wherein said drive means is peripherally connected to said rim.

16. A propeller system as set forth in claim 15 wherein said propeller system is mounted on a ship's hull and said drive means includes a drive shaft extending to a position substantially adjacent to said propeller, said drive shaft being substantially enclosed within said hull and connected with substantial speed reduction to drive said propeller.

17. A propeller system as set forth in claim 16 wherein at least a second separately driven propeller is mounted in said duct in series with the first named propeller and is rotated in a direction opposite to the direction of rotation of said first named propeller, the relative speeds of said propellers being arranged so that fluid discharged from the downstream propeller is substantially free of rotary components of motion.

18. A propeller system as set forth in claim 17 wherein the driving torque of said propellers is applied so that the hydrostatic pressure between said propellers is higher than the hydrostatic pressure downstream from said second propeller.

19. A propeller system as set forth in claim 1 wherein said rim is provided with a ring gear, and said drive means includes a pinion gear meshing with said ring gear, one of said gears being formed with a rubber surface.

20. A propeller system as set forth in claim 19 wherein said pinion gear is located within 30° of a position directly above said propeller.

21. A propeller system as set forth in claim 1 wherein said duct includes at least two nozzles connected in series, said propeller assembly is located in one of said nozzles, a second propeller is located in the other of said nozzles, and separate drive means are connected to each propeller operable to drive said propellers at different rotational speeds, said nozzles cooperating to completely confine the slipstream as it passes between said propellers.

22. A propeller system as set forth in claim 21 wherein said different speeds are related so that the hydrostatic pressure between said propellers is greater than the hydrostatic pressure on the exit side of the downstream propeller.

23. A propeller system as set forth in claim 21 wherein said drive means rotate said propellers in opposite directions.

24. A propeller system comprising a nozzle housing through which fluid is adapted to flow, at least first and second axially spaced propeller assemblies in said housing each provided with a nozzle and an associated propeller having a peripheral ring with its inner surface substantially flush with the inner wall of the associated nozzle, a water-lubricated peripheral bearing mounted in said housing engaging each ring to radially and axially locate each propeller within its assembly while permitting independent rotation thereof, a first water-lubricated drive for said first propeller assembly, a second water-lubricated drive for said second propeller assembly, said first and second drives being adapted to drive said propeller assemblies at different speeds of rotation.

25. A propeller system as set forth in claim 24 wherein said drives rotate said propellers in opposite directions.

26. A propeller system as set forth in claim 25 wherein said gear drives each include a separate drive shaft spaced from and extending generally parallel to the other drive shaft.

27. A propeller system as set forth in claim 1 wherein said duct is part of a nozzle, said nozzle including a support ring, and a rubber nozzle portion mounted on said ring and extending axially therefrom and defining both the inner and outer surfaces of at least part of the axial extent of the nozzle, said nozzle when in operation moving in an axial direction through water.

28. A propeller system as set forth in claim 27 wherein said rubber nozzle portion has a hardness between 80 and 90 on the Shore C scale.

29. A propeller system as set forth in claim 27 wherein said rubber nozzle portion includes a plurality of arcuate sectors cooperating to define a circular portion of said nozzle and wherein each sector is mounted at one end on said support ring.

30. A nozzle as set forth in claim 29 wherein said sectors are provided with radial surfaces engaging mating surfaces on adjacent sectors, and a propeller is journaled in said nozzle to drive water therethrough.

References Cited

UNITED STATES PATENTS

| | | | |
|---|---|---|---|
| 1,387,416 | 8/1921 | Lemieux | 115—34 |
| 2,085,282 | 6/1937 | Waterval | 170—168 |
| 2,272,128 | 2/1942 | Osbourne | 115—34 |
| 2,343,711 | 3/1944 | Rustberg | 60—211 |
| 2,727,485 | 12/1955 | Combs | 115—37 X |
| 3,167,361 | 1/1965 | Snapp et al. | 115—34 X |
| 3,185,122 | 5/1965 | Pleuger | 115—34 X |
| 3,215,411 | 11/1965 | Pitts | 74—215 X |
| 3,361,107 | 1/1968 | Weber | 115—34 |
| 3,367,116 | 2/1968 | Stallman | 115—42 X |

TRYGVE M. BLIX, Primary Examiner

U.S. Cl. X.R.

103—94; 114—151; 115—34; 184—6

PO-1050
(5/69)

UNITED STATES PATENT OFFICE
CERTIFICATE OF CORRECTION

Patent No. 3,487,805  Dated January 6, 1970

Inventor(s) James Glenn Satterthwaite and James B. Macy, Jr.

It is certified that error appears in the above-identified patent and that said Letters Patent are hereby corrected as shown below:

Column 2, line 46, "to" should read -- so -- .

Column 4, line 58, after "pressure" insert -- between the propellers is higher than the hydrostatic pressure -- .

Column 3, line 43, "journalled" should read -- journaled -- .

Column 7, line 41, "is" should read -- as -- .

Column 8, line 16, "preferably" should read -- preferable --

Column 8, line 66, "encosed" should read -- enclosed -- .

IN THE CLAIMS:

Claim 7, line 8, "elemets" should read -- elements -- .

Claim 9, line 20, "proivde" should read -- provide -- .

SIGNED AND
SEALED

JUL 28 1970

(SEAL)
Attest:

Edward M. Fletcher, Jr.
Attesting Officer

WILLIAM E. SCHUYLER, JR.
Commissioner of Patents